US012498104B2

(12) United States Patent
Bai et al.

(10) Patent No.: US 12,498,104 B2
(45) Date of Patent: Dec. 16, 2025

(54) ANGLE-ADJUSTABLE LAMP

(71) Applicant: NINGBO JINGHUI OPTO-ELECTRONIC CO., LTD., Ningbo (CN)

(72) Inventors: Guohui Bai, Ningbo (CN); Xia Xiao, Ningbo (CN)

(73) Assignee: NINGBO JINGHUI OPTO-ELECTRONIC CO., LTD., Ningbo (CN)

( * ) Notice: Subject to any disclaimer, the term of this patent is extended or adjusted under 35 U.S.C. 154(b) by 38 days.

(21) Appl. No.: 18/588,705

(22) Filed: Feb. 27, 2024

(65) Prior Publication Data

US 2025/0198601 A1 Jun. 19, 2025

(30) Foreign Application Priority Data

Dec. 15, 2023 (CN) ......................... 202323430269.7

(51) Int. Cl.
*F21V 21/30* (2006.01)
*F21V 14/02* (2006.01)

(52) U.S. Cl.
CPC .................................... *F21V 14/02* (2013.01)

(58) Field of Classification Search
CPC ......................................................... F21S 8/00
See application file for complete search history.

(56) References Cited

FOREIGN PATENT DOCUMENTS

CN 115507316 A * 12/2022
CN 116241833 A * 6/2023

* cited by examiner

*Primary Examiner* — Joseph L Williams
(74) *Attorney, Agent, or Firm* — Maschoff Brennan

(57) ABSTRACT

An angle-adjustable lamp is provided, including a frame body, a guide rail frame and a lamp body. The frame body has a mounting space, and a bottom surface of the mounting space runs through the frame body and forms a first opening in the frame body. The guide rail frame is rotatably arranged in the mounting space, the lamp body is rotatably arranged on the guide rail frame, and an axis of rotation of the guide rail frame with respect to the mounting space is not parallel with an axis of rotation of the lamp body with respect to the guide rail frame. According to the present disclosure, by rotating the lamp body with respect to the guide rail frame, a light exit angle of the lamp body can be adjusted.

8 Claims, 6 Drawing Sheets

ANGLE-ADJUSTABLE LAMP

TECHNICAL FIELD

The present disclosure relates to the field of lighting equipment, and in particular to an angle-adjustable lamp.

BACKGROUND

Lamps are essential appliances in people's lives. They can provide light for people in a dim environment.

However, it is usually impossible to adjust the light exit angle of the existing lamps, or it is only possible for the existing lamps to realize left-right swing rotation in one dimension. Therefore, the existing lamps cannot meet the needs of users well.

SUMMARY

In order to overcome the defects in the related art, the present disclosure provides an angle-adjustable lamp. By rotating a lamp body with respect to a guide rail frame, a light exit angle of the lamp body can be adjusted; and by rotating the guide rail frame with respect to a frame body, the light exit angle of the lamp body can also be adjusted. Therefore, the light exit angle of the lamp body can be adjusted to any direction, so that the lamp body can irradiate any position, which greatly improves the user experience.

In order to achieve the above purpose, the present disclosure adopts the following technical solution:

An angle-adjustable lamp includes a frame body, a guide rail frame and a lamp body. The frame body has a mounting space, and a bottom surface of the mounting space runs through the frame body and forms a first opening in the frame body. The guide rail frame is rotatably arranged in the mounting space, the lamp body is rotatably arranged on the guide rail frame, and an axis of rotation of the guide rail frame with respect to the mounting space is not parallel with an axis of rotation of the lamp body with respect to the guide rail frame.

With the above structure, by rotating the lamp body with respect to the guide rail frame, a light exit angle of the lamp body can be adjusted; and by rotating the guide rail frame with respect to the frame body, the light exit angle of the lamp body can also be adjusted. Moreover, since the axis of rotation of the guide rail frame with respect to the mounting space is not parallel with the axis of rotation of the lamp body with respect to the guide rail frame, the light exit angle of the lamp body can be adjusted to any direction, so that the lamp body can irradiate any position, which greatly improves the user experience.

Further, an axis of rotation of the guide rail frame with respect to the frame body is perpendicular to the axis of rotation of the lamp body with respect to the guide rail frame.

With the above structure, the structure of the angle-adjustable lamp is more reasonable in arrangement, and the light exit angle of the lamp body can be better adjusted.

Further, the axis of rotation of the guide rail frame with respect to the mounting space is parallel or coincident with an axis of the first opening; or the axis of rotation of the lamp body with respect to the guide rail frame is parallel or coincident with the axis of the first opening.

With the above structure, in the case that the axis of rotation of the guide rail frame with respect to the mounting space is parallel or coincident with the axis of the first opening, plane rotation of the guide rail frame in the plane parallel to the first opening is realized. Moreover, since the axis of rotation of the guide rail frame with respect to the mounting space is not parallel with the axis of rotation of the lamp body with respect to the guide rail frame, swing rotation of the lamp body with respect to the guide rail frame is realized.

In the case that the axis of rotation of the lamp body with respect to the guide rail frame is parallel or coincident with the axis of the first opening, plane rotation of the lamp body in the plane parallel to the first opening is realized. Moreover, since the axis of rotation of the guide rail frame with respect to the mounting space is not parallel with the axis of rotation of the lamp body with respect to the guide rail frame, swing rotation of the guide rail frame with respect to the mounting space is realized.

With the above structure, the structure of the angle-adjustable lamp is more reasonable in arrangement, and under the cooperation of the plane rotation and the swing rotation, the light exit angle of the lamp body can be better adjusted, which facilitates the operation of the user.

Further, the axis of rotation of the guide rail frame with respect to the mounting space is parallel or coincident with the axis of the first opening.

A first guide rail limit portion and a second guide rail limit portion are arranged in the mounting space. The first guide rail limit portion and the second guide rail limit portion are parallel with the first opening, and the second guide rail limit portion is located on one side of the first guide rail limit portion in an axial direction of the first opening and is in a spacing fit with the first guide rail limit portion. Correspondingly, the guide rail frame includes a guide rail limit fitting portion protruding outward, and the guide rail limit fitting portion is movably arranged between the first guide rail limit portion and the second guide rail limit portion. At least one of the first guide rail limit portion, the second guide rail limit portion and the guide rail limit fitting portion has an annular structure or an annular sector structure.

With the above structure, the guide rail frame can be rotatably mounted in the mounting space. The guide rail limit fitting portion is movably arranged in the first guide rail limit portion and the first guide rail limit portion, so that the first guide rail limit portion and the second guide rail limit portion limit the movement of the guide rail in the axial direction of the first opening. Since at least one of the first guide rail limit portion, the second guide rail limit portion and the guide rail limit fitting portion has an annular structure or an annular sector structure, the guide rail limit fitting portion can slide around the shafts between the first guide rail limit portion and the second guide rail limit portion, thereby realizing the rotation of the guide rail frame with respect to the mounting space.

In a case that at least one of the first guide rail limit portion, the second guide rail limit portion and the guide rail limit fitting portion has an annular structure, the guide rail frame can rotate by 360 degrees. In a case that at least one of the first guide rail limit portion, the second guide rail limit portion and the guide rail limit fitting portion only has an annular sector structure, the angle by which the guide rail frame can rotate is determined by the corresponding central angle of the annular sector structure in the first guide rail limit portion, the second guide rail limit portion and the guide rail limit fitting portion.

Further, the frame body includes a panel and a panel enclosure wall. The panel has an annular structure, and an inner hole of the panel forms the first opening. The panel enclosure wall is arranged around the first opening and extends to a side away from the panel to form the mounting space. An inner wall of the panel enclosure wall protrudes inward in a radial direction to form the annular first guide rail limit portion.

The guide rail frame includes the annular guide rail limit fitting portion. An outer diameter of the guide rail limit fitting portion is greater than an inner diameter of the first guide rail limit portion, and the outer diameter of the guide rail limit fitting portion is smaller than or equal to an outer diameter of the first guide rail limit portion.

The frame body includes a limit member detachably mounted on the panel enclosure wall. At least a part of the limit member is located inside the panel enclosure wall, and the part of the limit member located inside the panel enclosure wall protrudes inward along the radial direction of the panel enclosure wall to form the second guide rail limit portion. A distance between an end of the second guide rail limit portion facing an axis of the panel enclosure wall and the axis of the panel enclosure wall is smaller than an outer radius of the guide rail limit fitting portion and greater than an inner radius of the guide rail limit fitting portion.

With the above structure, the guide rail frame can be conveniently mounted to the frame body. Specifically, the frame body is put into the panel enclosure wall, and the guide rail limit fitting portion of the guide rail frame is put onto the first guide rail limit portion arranged in the panel enclosure wall. Then, the limit member is mounted to the panel enclosure wall, and the second guide rail limit portion on the limit member is located above the guide rail limit fitting portion, so that the guide rail frame is mounted.

Further, multiple limit members are provided, and the multiple limit members are arranged on the panel enclosure wall at uniform spacing.

With the above structure, the multiple limit members arranged can better limit the guide rail limit fitting portion of the guide rail frame, so that the guide rail frame can rotate more stably and reliably. Specifically, two limit members symmetrically are arranged on two sides of the panel enclosure wall.

Further, the limit member includes a first limit vertical portion, a second limit vertical portion and a limit connecting portion. The first limit vertical portion is arranged opposite to the second limit vertical portion, and the limit connecting portion is configured to connect same side ends of the first limit vertical portion and the second limit vertical portion. The first limit vertical portion and the second limit vertical portion are spaced apart such that the first limit vertical portion and the second limit vertical portion are respectively located inside and outside the panel enclosure wall.

An end of the first limit vertical portion away from the limit connecting portion protrudes inward along the radial direction of the panel enclosure wall to form the second guide rail limit portion.

With the above structure, the limit member can be conveniently mounted to the panel enclosure wall. The limit member can be arranged on the panel enclosure wall through the limit connecting portion, which facilitates the subsequent fixation. Of course, the limit member may also be an integrated piece. The first limit vertical portion, the second limit vertical portion and the limit connecting portion may form an elastic structure to clamp the panel enclosure wall, which facilitates the subsequent fixation.

Further, the panel enclosure wall forms a limit mounting portion in a position where the limit member is mounted. The limit member is detachably mounted on the limit mounting portion of the panel enclosure wall through a first fastener.

With the above structure, the limit member can be fixed onto the panel enclosure wall more firmly by using the first fastener. Specifically, the first fastener is a screw.

Further, the limit member is provided with a first fastening fit through hole matched with the first fastener, and the limit mounting portion is provided with a second fastening fit through hole matched with the first fastener. A distance between the first fastening fit through hole and the second guide rail limit portion is smaller than a distance between the second fastening fit through hole and the first guide rail limit portion.

With the above structure, the limit members are put onto the limit mounting portion of the panel enclosure wall, the first fastening fit through holes in the limit members are aligned with the second fastening fit through holes in the limit mounting portions, and the first fasteners are fitted with the first fastening fit through holes and the second fastening fit through holes such that the limit members are mounted. Moreover, the second guide rail limit portion is arranged at a distance from the first guide rail limit portion. Specifically, the first fastening fit through hole is provided in the first limit vertical portion and the second limit vertical portion and runs through the first limit vertical portion and the second limit vertical portion.

Further, the limit mounting portion protrudes respectively on left and right sides of the limit member to form limiting and positioning ribs.

With the above structure, the limiting and positioning ribs arranged can position the limit member when mounting the limit member. Moreover, after the limit member is mounted to the limit mounting portion, the limiting and positioning ribs can limit the limit member to prevent the limit member from moving and deviating, so that the limit member can be mounted on the limit mounting portion more stably and reliably.

Further, the limit mounting portion of the panel enclosure wall extends along a height direction of the panel enclosure wall to be higher than a part of the panel enclosure wall where the limit mounting portion is not formed.

With the above structure, due to the heightened limit mounting portion, the limit member can be better mounted onto the limit mounting portion.

Further, a side of one of the multiple limit members facing the lamp body is provided with a first rotation limiting portion. A side of the guide rail frame away from the lamp body is provided with a second rotation limiting portion which cooperates with the first rotation limiting portion to limit rotation of the guide rail frame.

With the above structure, when the guide rail frame is rotated, the second rotation limiting portion on the guide rail frame will contact the first rotation limiting portion, thereby preventing the guide rail frame from continuing rotating in a direction of this side. The above structure is reasonable in design.

Further, two symmetrical sides of a side wall of the lamp body are mounted to the guide rail frame through second fasteners, and the second fasteners on the two sides of the side wall of the lamp body are coaxially arranged to realize a rotatable connection of the lamp body with respect to the guide rail frame.

With the above structure, the lamp body can be rotatably mounted on the guide rail frame. Specifically, the second fastener is a screw.

Further, the side wall of the lamp body is symmetrically provided with two connecting shafts, and a side end surface of each of the connecting shafts away from the lamp body is axially depressed to form a third fastening fit hole matched with the second fastener. Positions on the guide rail frame for mounting and connecting the lamp body are symmetrically provided with two connecting shaft holes that allow the second fasteners to pass through. The two connecting shafts and the two connecting shaft holes are coaxially arranged. The second fastener passes through the connecting shaft hole and is in a fastening fit with the third fastening fit hole in the connecting shaft.

With the above structure, the structure of mounting the lamp body to the guide rail frame is more reasonable, so that the lamp body can be rotatably mounted to the guide rail frame more stably and reliably.

Further, the positions on the guide rail frame for connecting the lamp body form lamp body mounting portions.

The lamp body mounting portions each have a first end surface located below the connecting shaft, a second end surface and a third end surface located on left and right sides of the connecting shaft, and a fourth end surface arranged opposite to a side end surface of the connecting shaft away from the lamp body, and the first end surface, the second end surface, the third end surface and the fourth end surface form a shaft body placement groove for placing the connecting shaft. Sides in the shaft body placement groove opposite to the first end surface and the fourth end surface are opened.

The connecting shaft hole is provided in the fourth end surface.

With the above structure, the shaft body placement groove arranged can support and limit the connecting shaft of the lamp body, which facilitates pre-mounting of the lamp body during mounting and also facilitates subsequent mounting of the lamp body through the second fasteners.

Further, the guide rail frame includes a guide rail frame enclosure wall having a cylindrical structure, and the lamp body mounting portion is formed on the guide rail frame enclosure wall. An outer diameter of the guide rail frame enclosure wall is greater than an outer diameter of the lamp body.

With the above structure, the structure of the guide rail frame is more reasonable, and the influence of the guide rail frame on the rotation of the lamp body is avoided. Specifically, an outer side wall of the guide rail frame enclosure wall protrudes outward in the radial direction to form the guide rail limit fitting portion.

Further, the lamp body includes a lamp body housing and a light source assembly. The lamp body housing has a light source mounting cavity for accommodating and mounting the light source assembly.

A bottom surface of the lamp body housing is provided with a light exit opening. The light source assembly has a light exit surface, and the light exit surface faces the light exit opening.

With the above structure, the structure of the lamp body is more reasonable, and facilitates the assembly of the lamp body.

Further, the light source assembly includes a light source body, a reflective cup and a diffusing plate. A light emitting side of the light source body faces the light exit opening. The reflective cup has a light entrance port and a light exit port, and an inner wall of the reflective cup connected between the light entrance port and the light exit port forms a reflective surface. The light entrance port of the reflective cup faces the light emitting side of the light source body, and the light exit port faces the light exit opening. The diffusing plate is arranged between the light exit port of the reflective cup and the light exit opening to form the light exit surface.

With the above structure, the structure of the light source assembly is more reasonable in arrangement. Light is emitted by the light source body and enters the reflective cup through the light entrance port of the reflective cup. Since the reflective surface is arranged on the inner wall of the reflective cup, light can be more intensive and exit from the side of the light exit port of the reflective cup. The diffusing plate arranged at the light exit opening can convert a point or line light source into a soft and uniform surface light source.

Specifically, the light source body is a lamp board provided with multiple LED light beads.

Further, a top surface of the lamp body housing is provided with a mounting opening, and the light source body is matched with the mounting opening.

With the above structure, the light source assembly can be conveniently mounted.

Further, the angle-adjustable lamp includes a power supply, and the power supply is connected to the light source assembly so as to provide energy for the light source assembly. Specifically, the power supply is a power adapter.

With the above structure, external power can be converted into power adapted to the light source assembly, so as to ensure the normal operation of the light source assembly.

Further, two sides of the frame body are provided with torsion spring clips configured to fix the angle-adjustable lamp. Correspondingly, the frame body is provided with clip seats configured to mount the torsion spring clips.

With the above structure, due to the arrangement of the torsion spring clips, the angle-adjustable lamp can be mounted and fixed more quickly and conveniently.

Further, the torsion spring clip includes a torsion spring arranged on the frame body and a clip sleeve sleeved over the torsion spring.

With the above structure, due to the arrangement of the clip sleeves, forces can be better applied to the torsion spring clips, thereby ensuring the angle-adjustable lamp to be mounted and fixed stably and reliably.

Compared with the related art, the present disclosure has the following beneficial effects:

(1) According to the angle-adjustable lamp of the present disclosure, by rotating the lamp body with respect to the guide rail frame, the light exit angle of the lamp body can be adjusted; and by rotating the guide rail frame with respect to the frame body, the light exit angle of the lamp body can also be adjusted. Moreover, since the axis of rotation of the guide rail frame with respect to the mounting space is not parallel with the axis of rotation of the lamp body with respect to the guide rail frame, the light exit angle of the lamp body can be adjusted to any direction, so that the lamp body can irradiate any position, which greatly improves the user experience.

(2) The structure of the angle-adjustable lamp of the present disclosure is reasonable in arrangement.

BRIEF DESCRIPTION OF FIGURES

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

Figure 1:
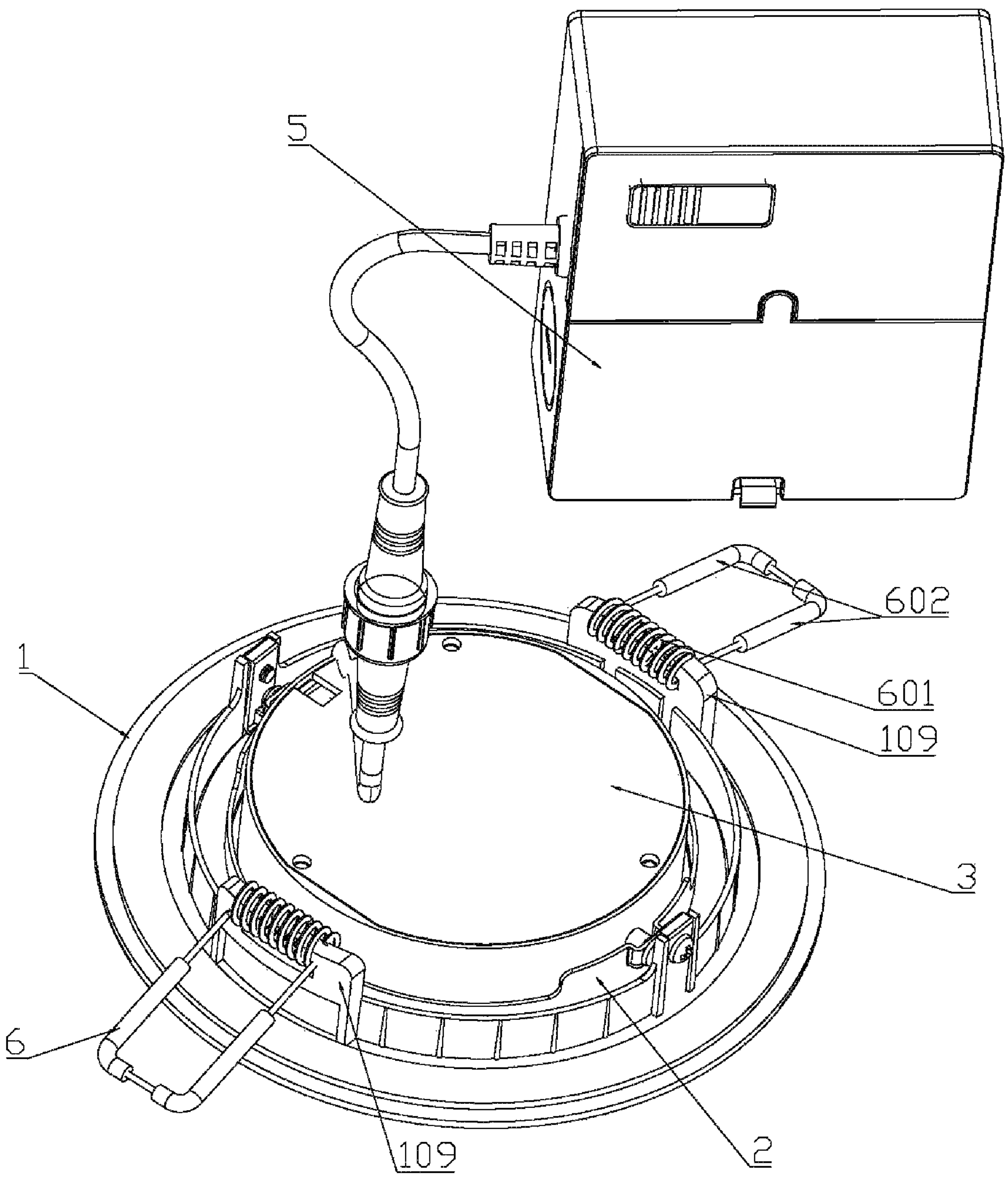
FIG. 1 is a schematic three-dimensional structural view of an angle-adjustable lamp of the present disclosure.

Corresponding component names of reference numerals in the figures: 1, frame body; 101, mounting space; 102, first opening; 103, first guide rail limit portion; 104, second guide rail limit portion; 105, panel; 106, panel enclosure wall; 1061, limit mounting portion; 1061*a*, second fastening fit through hole; 1061*b*, limiting and positioning rib; 107, limit member; 1071, first limit vertical portion; 1072, second limit vertical portion; 1073, limit connecting portion; 1074, first fastening fit through hole; 1075, first rotation limiting portion; 108, first fastener; 109, clip seat; 2, guide rail frame; 201, guide rail limit fitting portion; 202, connecting shaft hole; 203, lamp body mounting portion; 2031, first end surface; 2032, second end surface; 3033, third end surface; 2034, fourth end surface; 2035, shaft body placement groove; 204, guide rail frame enclosure wall; 205, second rotation limiting portion; 3, lamp body; 301, connecting shaft; 3011, third fastening fit hole; 302, lamp body housing; 3021, light source mounting cavity; 3022, light exit opening; 3023, mounting opening; 303, light source assembly; 3031, light exit surface; 3032, light source body; 3033, reflective cup; 3033*a*, light entrance port; 3033*b*, light exit port; 3033*c*, reflective surface; 3034, diffusing plate; 4, second fastener; 5, power supply; 6, torsion spring clip; 601, torsion spring; and 602, clip sleeve.

DETAILED DESCRIPTION

This application will be described in detail below in conjunction with accompanying drawings and specific embodiments.

The embodiments of this application are described below through specific examples. Those skilled in the art can easily understand the other advantages and effects of this application from the content disclosed in the specification. It is apparent that the described embodiments are only a part, rather than all of the embodiments of this application. This application may also be implemented or applied through other different specific implementations, and various details in the specification may also be modified or changed based on different viewpoints and applications without departing from the spirit of this application. It should be noted that the embodiments in the following and the features in the embodiments can be combined with each other in case of no conflict. All other embodiments obtained by those of ordinary skill in the art based on the embodiments of this application without creative work are within the protection scope of this application.

It is noted that various aspects of the embodiments within the scope of the appended claims are described below. It is apparent that the aspects described herein can be embodied in a wide variety of forms, and any specific structure and/or function described herein is merely illustrative. Based on this application, those skilled in the art should understand that one aspect described herein may be implemented independently of any other aspect, and two or more of these aspects may be combined in various ways. For example, equipment and/or methods may be implemented using any number of aspects described herein. In addition, the equipment and/or the method may be implemented using other structures and/or functionalities than one or more of the aspects described herein.

It should also be noted that the drawings provided in the following embodiments only schematically illustrate the basic concept of this application, and the drawings show only the components related to this application instead of being drawn according to the quantity, shape and size of the components in actual implementation. In actual implementation, the shape, quantity and proportion of the components may be changed at will, and the layout of components may be more complicated.

In addition, in the following description, specific details are provided to facilitate a thorough understanding of the examples. However, it will be understood by those skilled in the art that the present disclosure may be implemented without these specific details.

In the description of the present disclosure, it should also be noted that, unless otherwise clearly specified and defined, the terms "mount", "connect" and "link" should be understood in a broad sense. For example, it may be a fixed connection, a detachable connection or an integral connection; or may be a mechanical connection or an electrical connection; or may be a direct link or an indirect link through an intermediate medium, or may be an internal communication between two elements. For those of ordinary skill in the art, the specific meaning of the above terms in the present disclosure can be understood in specific cases.

The technical solution provided by the embodiments of this application will be described with reference to the accompanying drawings.

Figure 2:
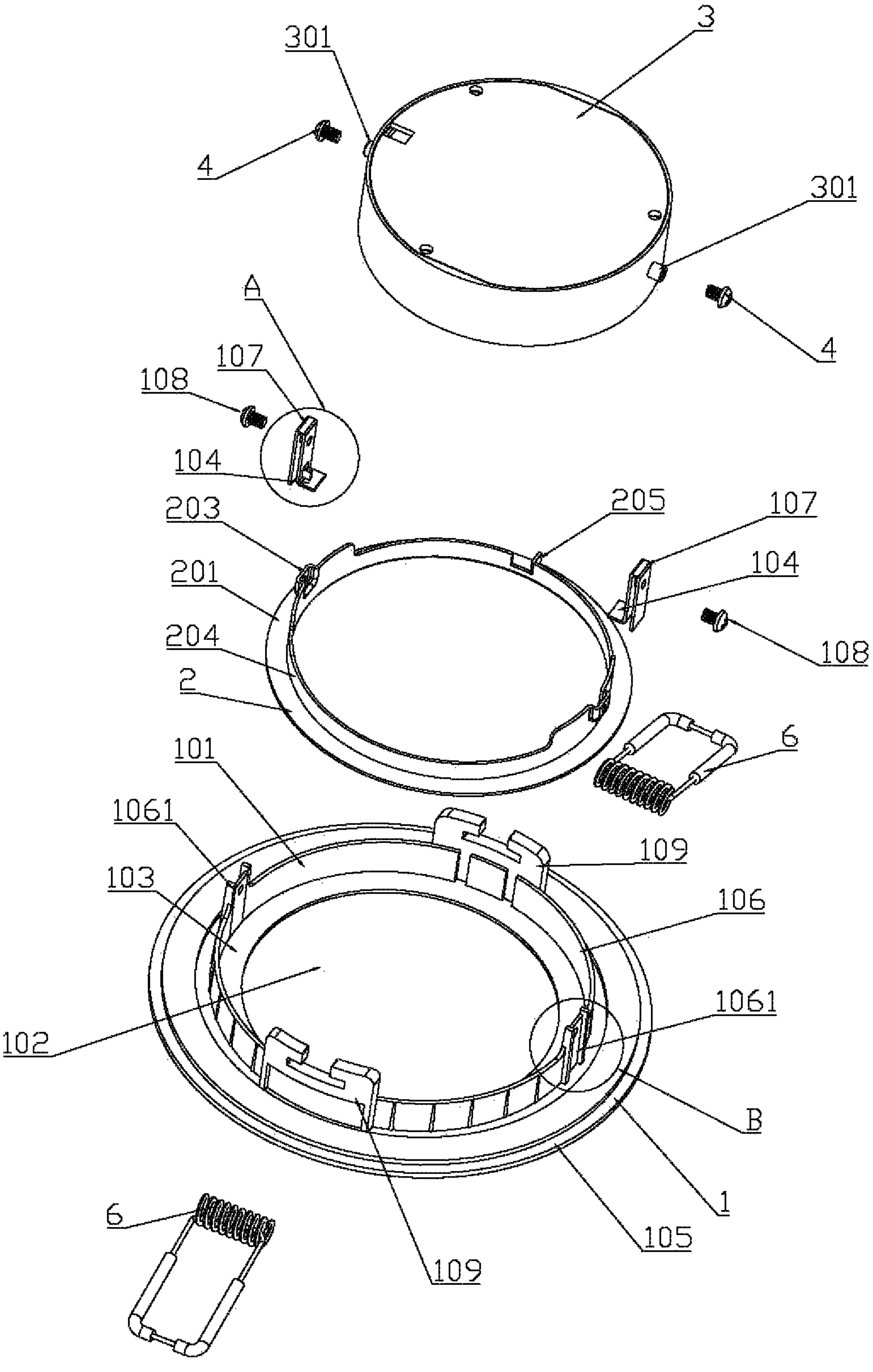
FIG. 2 is a schematic exploded structural view of the angle-adjustable lamp of the present disclosure.
Figure 3:
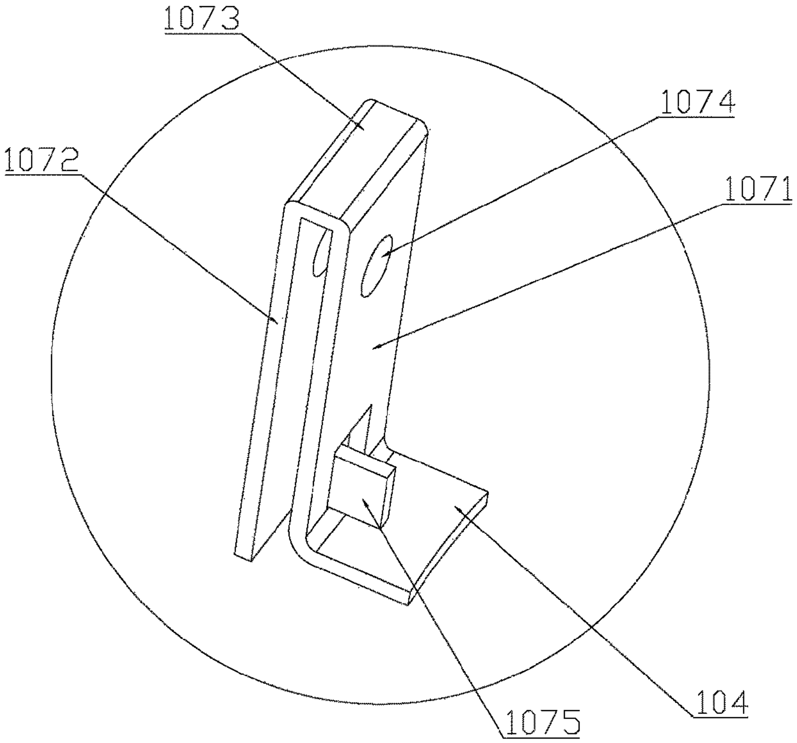
FIG. 3 is a schematic enlarged structural view of A in FIG. 2.
Figure 4:
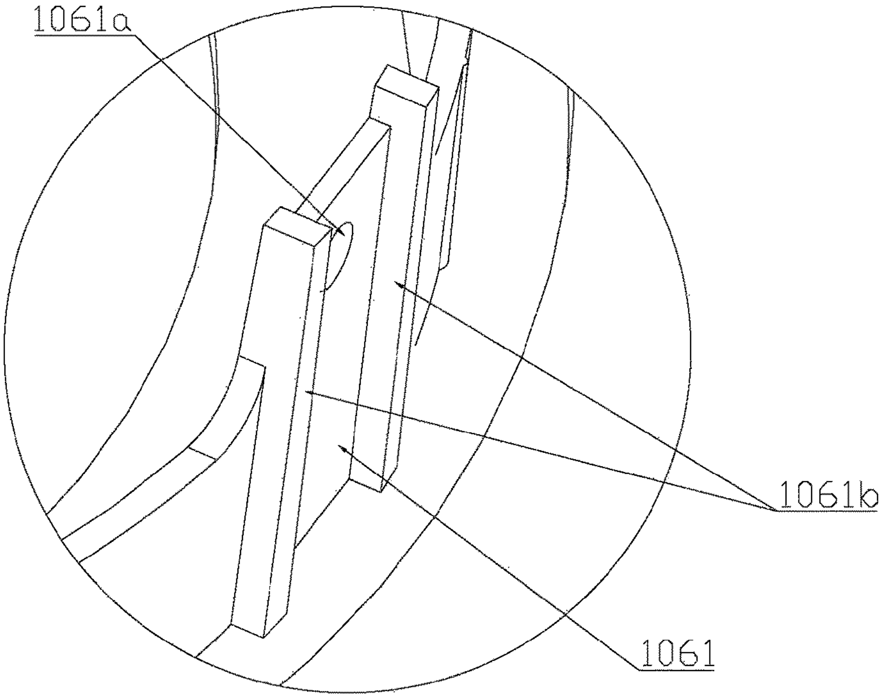
FIG. 4 is a schematic enlarged structural view of B in FIG. 2.
Figure 5:
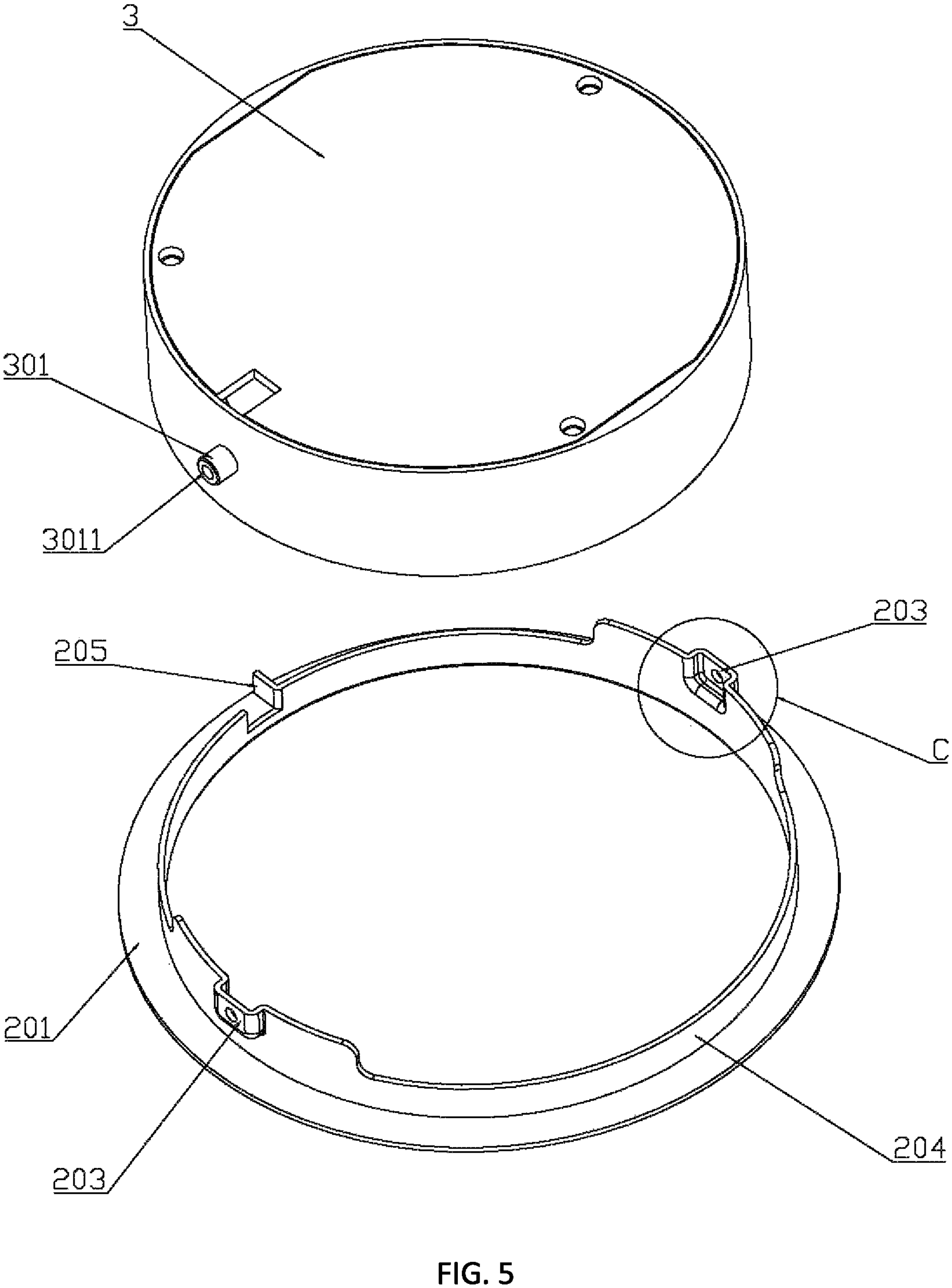
FIG. 5 is a schematic view showing mounting and fitting between a lamp body and a guide rail frame in the angle-adjustable lamp of the present disclosure.
Figure 6:
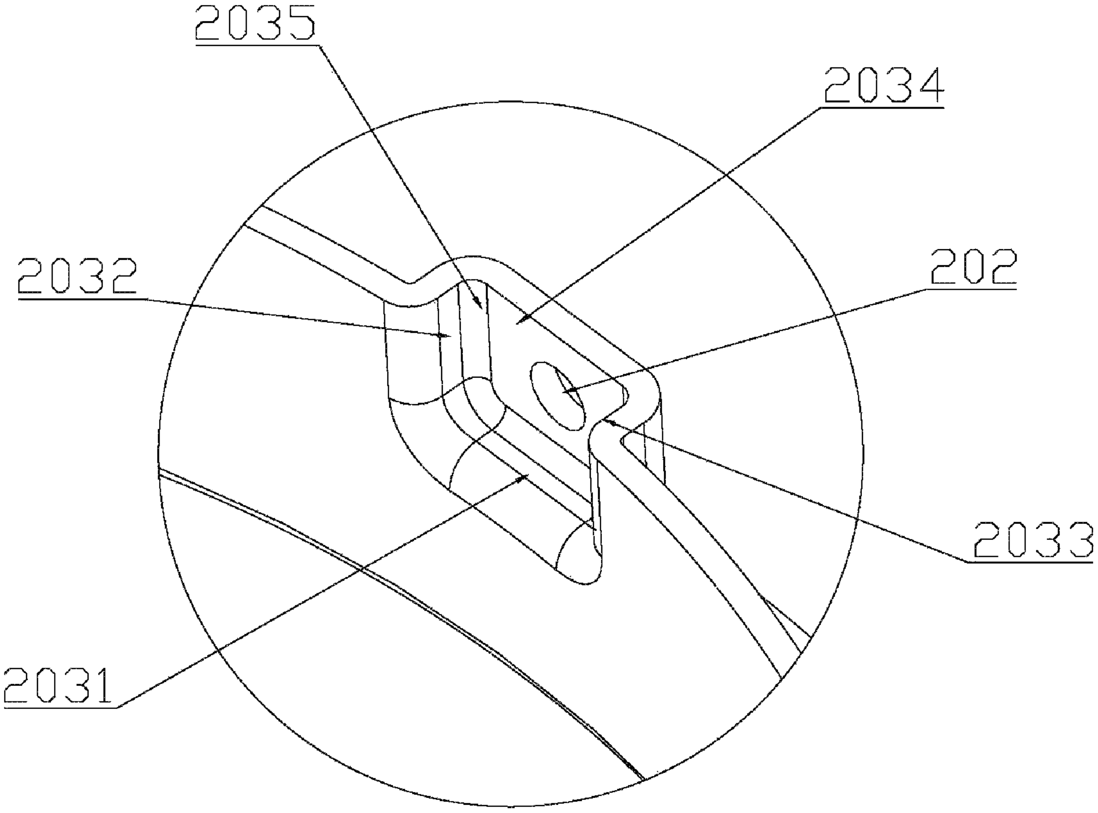
FIG. 6 is a schematic enlarged structural view of C in FIG. 5.
Figure 7:
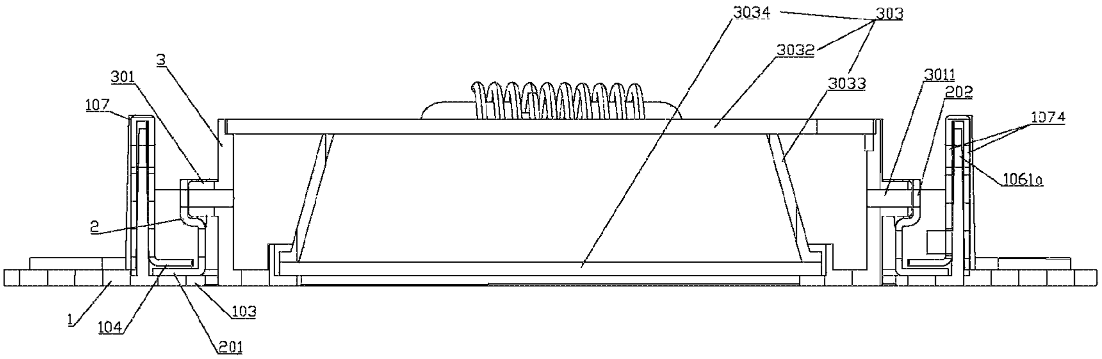
FIG. 7 is a schematic cross-sectional structural view of the angle-adjustable lamp of the present disclosure.
Figure 8:
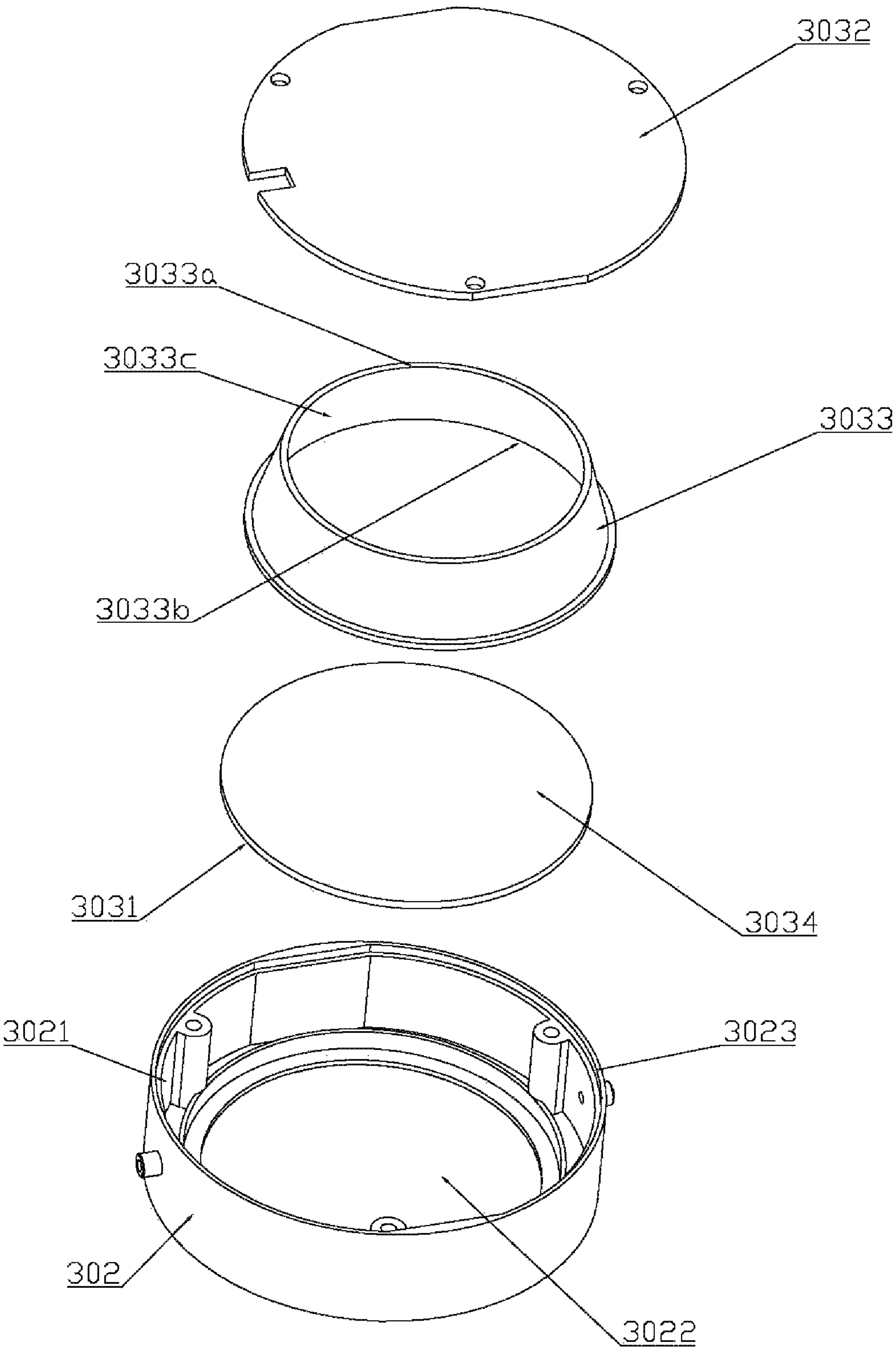
FIG. 8 is a schematic exploded structural view of the lamp body in the angle-adjustable lamp of the present disclosure.

Referring to FIG. 1 to FIG. 8, the present disclosure provides an angle-adjustable lamp, including a frame body 1, a guide rail frame 2 and a lamp body 3. The frame body 1 has a mounting space 101, and a bottom surface of the mounting space 101 runs through the frame body 1 and forms a first opening 102 in the frame body 1. The guide rail frame 2 is rotatably arranged in the mounting space 101, the lamp body 3 is rotatably arranged on the guide rail frame 2, and an axis of rotation of the guide rail frame 2 with respect to the mounting space 101 is not parallel with an axis of rotation of the lamp body 3 with respect to the guide rail frame 2.

With the above structure, by rotating the lamp body 3 with respect to the guide rail frame 2, a light exit angle of the lamp body 3 can be adjusted; and by rotating the guide rail frame 2 with respect to the frame body 1, the light exit angle of the lamp body 3 can also be adjusted. Moreover, since the axis of rotation of the guide rail frame 2 with respect to the mounting space 101 is not parallel with the axis of rotation of the lamp body 3 with respect to the guide rail frame 2, the light exit angle of the lamp body 3 can be adjusted to any direction, so that the lamp body 3 can irradiate any position, which greatly improves the user experience.

Further, an axis of rotation of the guide rail frame 2 with respect to the frame body 1 is perpendicular to the axis of rotation of the lamp body 3 with respect to the guide rail frame 2.

With the above structure, the structure of the angle-adjustable lamp is more reasonable in arrangement, and the light exit angle of the lamp body 3 can be better adjusted.

Further, the axis of rotation of the guide rail frame 2 with respect to the mounting space 101 is parallel or coincident with an axis of the first opening 102; or the axis of rotation of the lamp body 3 with respect to the guide rail frame 2 is parallel or coincident with the axis of the first opening 102.

With the above structure, in the case that the axis of rotation of the guide rail frame 2 with respect to the mounting space 101 is parallel or coincident with the axis of the first opening 102, plane rotation of the guide rail frame 2 in the plane parallel to the first opening 102 is realized. Moreover, since the axis of rotation of the guide rail frame 2 with respect to the mounting space 101 is not parallel with the axis of rotation of the lamp body 3 with respect to the guide rail frame 2, swing rotation of the lamp body 3 with respect to the guide rail frame 2 is realized.

In the case that the axis of rotation of the lamp body 3 with respect to the guide rail frame 2 is parallel or coincident with the axis of the first opening 102, plane rotation of the lamp body 3 in the plane parallel to the first opening 102 is realized. Moreover, since the axis of rotation of the guide rail frame 2 with respect to the mounting space 101 is not parallel with the axis of rotation of the lamp body 3 with respect to the guide rail frame 2, swing rotation of the guide rail frame 2 with respect to the mounting space 101 is realized.

With the above structure, the structure of the angle-adjustable lamp is more reasonable in arrangement, and under the cooperation of the plane rotation and the swing rotation, the light exit angle of the lamp body 3 can be better adjusted, which facilitates the operation of the user.

Further, the axis of rotation of the guide rail frame 2 with respect to the mounting space 101 is parallel or coincident with the axis of the first opening 102.

A first guide rail limit portion 103 and a second guide rail limit portion 104 are arranged in the mounting space 101. The first guide rail limit portion 103 and the second guide rail limit portion 104 are parallel with the first opening 102, and the second guide rail limit portion 104 is located on one side of the first guide rail limit portion 103 in an axial direction of the first opening 102 and is in a spacing fit with the first guide rail limit portion 103. Correspondingly, the guide rail frame 2 includes a guide rail limit fitting portion 201 protruding outward, and the guide rail limit fitting portion 201 is movably arranged between the first guide rail limit portion 103 and the second guide rail limit portion 104. At least one of the first guide rail limit portion 103, the second guide rail limit portion 104 and the guide rail limit fitting portion 201 has an annular structure or an annular sector structure.

With the above structure, the guide rail frame 2 can be rotatably mounted in the mounting space 101. The guide rail limit fitting portion 201 is movably arranged in the first guide rail limit portion 103 and the first guide rail limit portion 103, so that the first guide rail limit portion 103 and the second guide rail limit portion 104 limit the movement of the guide rail in the axial direction of the first opening 102. Since at least one of the first guide rail limit portion 103, the second guide rail limit portion 104 and the guide rail limit fitting portion 201 has an annular structure or an annular sector structure, the guide rail limit fitting portion 201 can slide around the shafts between the first guide rail limit portion 103 and the second guide rail limit portion 104, thereby realizing the rotation of the guide rail frame 2 with respect to the mounting space 101.

In a case that at least one of the first guide rail limit portion 103, the second guide rail limit portion 104 and the guide rail limit fitting portion 201 has an annular structure, the guide rail frame 2 can rotate by 360 degrees. In a case that at least one of the first guide rail limit portion 103, the second guide rail limit portion 104 and the guide rail limit fitting portion 201 only has an annular sector structure, the angle by which the guide rail frame 2 can rotate is determined by the corresponding central angle of the annular sector structure in the first guide rail limit portion 103, the second guide rail limit portion 104 and the guide rail limit fitting portion 201.

Further, the frame body 1 includes a panel 105 and a panel enclosure wall 106. The panel 105 has an annular structure, and an inner hole of the panel 105 forms the first opening 102. The panel enclosure wall 106 is arranged around the first opening 102 and extends to a side away from the panel 105 to form the mounting space 101. An inner wall of the panel enclosure wall 106 protrudes inward in a radial direction to form the annular first guide rail limit portion 103.

The guide rail frame 2 includes the annular guide rail limit fitting portion 201. An outer diameter of the guide rail limit fitting portion 201 is greater than an inner diameter of the first guide rail limit portion 103, and the outer diameter of the guide rail limit fitting portion 201 is smaller than or equal to an outer diameter of the first guide rail limit portion 103.

The frame body 1 includes a limit member 107 detachably mounted on the panel enclosure wall 106. At least a part of the limit member 107 is located inside the panel enclosure wall 106, and the part of the limit member 107 located inside the panel enclosure wall 106 protrudes inward along the radial direction of the panel enclosure wall 106 to form the second guide rail limit portion 104. A distance between an end of the second guide rail limit portion 104 facing an axis of the panel enclosure wall 106 and the axis of the panel enclosure wall 106 is smaller than an outer radius of the guide rail limit fitting portion 201 and greater than an inner radius of the guide rail limit fitting portion 201.

With the above structure, the guide rail frame 2 can be conveniently mounted to the frame body 1. Specifically, the frame body 1 is put into the panel enclosure wall 106, and the guide rail limit fitting portion 201 of the guide rail frame 2 is put onto the first guide rail limit portion 103 arranged in the panel enclosure wall 106. Then, the limit member 107 is mounted to the panel enclosure wall 106, and the second guide rail limit portion 104 on the limit member 107 is located above the guide rail limit fitting portion 201, so that the guide rail frame 2 is mounted.

Further, multiple limit members 107 are provided, and the multiple limit members 107 are arranged on the panel enclosure wall 106 at uniform spacing.

With the above structure, the multiple limit members 107 arranged can better limit the guide rail limit fitting portion 201 of the guide rail frame 2, so that the guide rail frame 2 can rotate more stably and reliably. Specifically, two limit members 107 are symmetrically arranged on two sides of the panel enclosure wall 106.

Further, the limit member 107 includes a first limit vertical portion 1071, a second limit vertical portion 1072 and a limit connecting portion 1073. The first limit vertical portion 1071 is arranged opposite to the second limit vertical portion 1072, and the limit connecting portion 1073 is configured to connect same side ends of the first limit vertical portion 1071 and the second limit vertical portion 1072. The first limit vertical portion 1071 and the second limit vertical portion 1072 are spaced apart such that the first limit vertical portion 1071 and the second limit vertical portion 1072 are respectively located inside and outside the panel enclosure wall 106.

An end of the first limit vertical portion 1071 away from the limit connecting portion 1073 protrudes inward along the radial direction of the panel enclosure wall 106 to form the second guide rail limit portion 104.

With the above structure, the limit member 107 can be conveniently mounted to the panel enclosure wall 106. The limit member 107 can be arranged on the panel enclosure wall 106 through the limit connecting portion 1073, which facilitates the subsequent fixation. Of course, the limit member 107 may also be an integrated piece. The first limit vertical portion 1071, the second limit vertical portion 1072 and the limit connecting portion 1073 may form an elastic structure to clamp the panel enclosure wall 106, which facilitates the subsequent fixation.

Further, the panel enclosure wall 106 forms a limit mounting portion 1061 in a position where the limit member 107 is mounted. The limit member 107 is detachably mounted on the limit mounting portion 1061 of the panel enclosure wall 106 through a first fastener 108.

With the above structure, the limit member 107 can be fixed onto the panel enclosure wall 106 more firmly by using the first fastener 108. Specifically, the first fastener 108 is a screw.

Further, the limit member 107 is provided with a first fastening fit through hole 1074 matched with the first fastener 108, and the limit mounting portion 1061 is provided with a second fastening fit through hole 1061*a* matched with the first fastener 108. A distance between the first fastening fit through hole 1074 and the second guide rail limit portion 104 is smaller than a distance between the second fastening fit through hole 1061*a* and the first guide rail limit portion 103.

With the above structure, the limit members 107 are put onto the limit mounting portion 1061 of the panel enclosure wall 106, the first fastening fit through holes 1074 in the limit members 107 are aligned with the second fastening fit through holes 1061*a* in the limit mounting portions 1061, and the first fasteners 108 are fitted with the first fastening fit through holes 1074 and the second fastening fit through holes 1061*a* such that the limit members 107 are mounted. Moreover, the second guide rail limit portion 104 is arranged at a distance from the first guide rail limit portion 103. Specifically, the first fastening fit through hole 1074 is provided in the first limit vertical portion 1071 and the second limit vertical portion 1072 and runs through the first limit vertical portion 1071 and the second limit vertical portion 1072.

Further, the limit mounting portion 1061 protrudes respectively on left and right sides of the limit member 107 to form limiting and positioning ribs 1061*b*.

With the above structure, the limiting and positioning ribs 1061*b* arranged can position the limit member 107 when mounting the limit member 107. Moreover, after the limit member 107 is mounted to the limit mounting portion 1061, the limiting and positioning ribs can limit the limit member 107 to prevent the limit member from moving and deviating, so that the limit member 107 can be mounted on the limit mounting portion 1061 more stably and reliably.

Further, the limit mounting portion 1061 of the panel enclosure wall extends along a height direction of the panel enclosure wall to be higher than a part of the panel enclosure wall where the limit mounting portion 1061 is not formed.

With the above structure, due to the heightened limit mounting portion 1061, the limit member 107 can be better mounted onto the limit mounting portion 1061.

Further, a side of one of the multiple limit members 107 facing the lamp body 3 is provided with a first rotation limiting portion 1075. A side of the guide rail frame 2 away from the lamp body 3 is provided with a second rotation limiting portion 205 which cooperates with the first rotation limiting portion 1075 to limit rotation of the guide rail frame 2.

With the above structure, when the guide rail frame 2 is rotated, the second rotation limiting portion 205 on the guide rail frame 2 will contact the first rotation limiting portion 1075, thereby preventing the guide rail frame 2 from continuing rotating in a direction of this side. The above structure is reasonable in design.

Further, two symmetrical sides of a side wall of the lamp body 3 are mounted to the guide rail frame 2 through second fasteners 4, and the second fasteners 4 on the two sides of the side wall of the lamp body 3 are coaxially arranged to realize a rotatable connection of the lamp body 3 with respect to the guide rail frame 2.

With the above structure, the lamp body 3 can be rotatably mounted on the guide rail frame 2. Specifically, the second fastener 4 is a screw.

Further, the side wall of the lamp body 3 is symmetrically provided with two connecting shafts 301, and a side end surface of each of the connecting shafts 301 away from the lamp body 3 is axially depressed to form a third fastening fit hole 3011 matched with the second fastener 4. Positions on the guide rail frame 2 for mounting and connecting the lamp body 3 are symmetrically provided with two connecting shaft holes 202 that allow the second fasteners 4 to pass through. The two connecting shafts 301 and the two connecting shaft holes 202 are coaxially arranged. The second fastener 4 passes through the connecting shaft hole 202 and is in a fastening fit with the third fastening fit hole 3011 in the connecting shaft 301.

With the above structure, the structure of mounting the lamp body 3 to the guide rail frame 2 is more reasonable, so that the lamp body 3 can be rotatably mounted to the guide rail frame 2 more stably and reliably.

Further, the positions on the guide rail frame 2 for connecting the lamp body 3 form lamp body mounting portions 203.

The lamp body mounting portions 203 each have a first end surface 2031 located below the connecting shaft 301, a second end surface 2032 and a third end surface 3033 located on left and right sides of the connecting shaft 301, and a fourth end surface 2034 arranged opposite to a side end surface of the connecting shaft 301 away from the lamp body 3, and the first end surface 2031, the second end surface 2032, the third end surface 3033 and the fourth end surface 2034 form a shaft body placement groove 2035 for placing the connecting shaft 301. Sides in the shaft body placement groove 2035 opposite to the first end surface 2031 and the fourth end surface 2034 are opened.

The connecting shaft hole 202 is provided in the fourth end surface 2034.

With the above structure, the shaft body placement groove 2035 arranged can support and limit the connecting shaft 301 of the lamp body 3, which facilitates pre-mounting of the lamp body 3 during mounting and also facilitates subsequent mounting of the lamp body 3 through the second fasteners 4.

Further, the guide rail frame 2 includes a guide rail frame enclosure wall 204 having a cylindrical structure, and the lamp body mounting portion 203 is formed on the guide rail frame enclosure wall 204. An outer diameter of the guide rail frame enclosure wall 204 is greater than an outer diameter of the lamp body 3.

With the above structure, the structure of the guide rail frame 2 is more reasonable, and the influence of the guide rail frame 2 on the rotation of the lamp body 3 is avoided. Specifically, an outer side wall of the guide rail frame enclosure wall 204 protrudes outward in the radial direction to form the guide rail limit fitting portion 201.

Further, the lamp body 3 includes a lamp body housing 302 and a light source assembly 303. The lamp body housing 302 has a light source mounting cavity for accommodating and mounting the light source assembly 303.

A bottom surface of the lamp body housing 302 is provided with a light exit opening. The light source assembly 303 has a light exit surface 3031, and the light exit surface 3031 faces the light exit opening.

With the above structure, the structure of the lamp body 3 is more reasonable, and facilitates the assembly of the lamp body 3.

Further, the light source assembly 303 includes a light source body 3032, a reflective cup 3033 and a diffusing plate 3034. A light emitting side of the light source body 3032 faces the light exit opening. The reflective cup 3033 has a light entrance port **3033*a* and a light exit port 3033*b*, and an inner wall of the reflective cup 3033 connected between the light entrance port 3033*a* and the light exit port 3033*b* forms a reflective surface 3033*c*. The light entrance port 3033*a* of the reflective cup 3033 faces the light emitting side of the light source body 3032, and the light exit port 3033*b* faces the light exit opening. The diffusing plate 3034 is arranged between the light exit port 3033*b* of the reflective cup 3033 and the light exit opening to form the light exit surface 3031**.

With the above structure, the structure of the light source assembly 303 is more reasonable in arrangement. Light is emitted by the light source body 3032 and enters the reflective cup 3033 through the light entrance port **3033*a* of the reflective cup 3033. Since the reflective surface 3033*c* is arranged on the inner wall of the reflective cup 3033, light can be more intensive and exit from the side of the light exit port 3033*b* of the reflective cup 3033. The diffusing plate 3034** arranged at the light exit opening can convert a point or line light source into a soft and uniform surface light source.

Specifically, the light source body 3032 is a lamp board provided with multiple LED light beads.

Further, a top surface of the lamp body housing 302 is provided with a mounting opening 3023, and the light source body is matched with the mounting opening 3023.

With the above structure, the light source assembly 303 can be conveniently mounted.

Further, the angle-adjustable lamp includes a power supply 5, and the power supply 5 is connected to the light source assembly 303 so as to provide energy for the light source assembly. Specifically, the power supply 5 is a power adapter.

With the above structure, external power can be converted into power adapted to the light source assembly 303, so as to ensure the normal operation of the light source assembly 303.

Further, two sides of the frame body 1 are provided with torsion spring clips 6 configured to fix the angle-adjustable lamp. Correspondingly, the frame body 1 is provided with clip seats 109 configured to mount the torsion spring clips 6.

With the above structure, due to the arrangement of the torsion spring clips 6, the angle-adjustable lamp can be mounted and fixed more quickly and conveniently.

Further, the torsion spring clip 6 includes a torsion spring 601 arranged on the frame body 1 and a clip sleeve 602 sleeved over the torsion spring 601.

With the above structure, due to the arrangement of the clip sleeves 602, forces can be better applied to the torsion spring clips 6, thereby ensuring the angle-adjustable lamp to be mounted and fixed stably and reliably.

For the same or similar parts between the embodiments in the specification, reference may be made to each other. Each embodiment focuses on differences from other embodiments.

The foregoing descriptions are merely specific implementations of this application, but the protection scope of this application is not limited thereto. Any variation or replacement readily figured out by those skilled in the art within the technical scope disclosed in this application shall fall within the protection scope of this application. Therefore, the protection scope of this application shall be subject to the protection scope of the claims.

What is claimed is:

1. An angle-adjustable lamp, comprising:
a frame body,
a guide rail frame, and
a lamp body,
wherein:
the frame body has a mounting space, and a bottom surface of the mounting space runs through the frame body and forms a first opening in the frame body;
the guide rail frame is rotatably arranged in the mounting space, the lamp body is rotatably arranged on the guide rail frame, an axis of rotation of the guide rail frame with respect to the mounting space is not parallel with an axis of rotation of the lamp body with respect to the guide rail frame, and the axis of rotation of the guide rail frame with respect to the mounting space is parallel or coincident with an axis of the first opening;
a first guide rail limit portion and a second guide rail limit portion are arranged in the mounting space, the first guide rail limit portion and the second guide rail limit portion being parallel with the first opening, and the second guide rail limit portion being located on one side of the first guide rail limit portion in an axial direction of the first opening and is in a spacing fit with the first guide rail limit portion;
correspondingly, the guide rail frame comprises a guide rail limit fitting portion protruding outward, and the guide rail limit fitting portion is movably arranged between the first guide rail limit portion and the second guide rail limit portion; and
at least one of the first guide rail limit portion, the second guide rail limit portion and the guide rail limit fitting portion has an annular structure or an annular sector structure.

2. The angle-adjustable lamp according to claim 1, wherein an axis of rotation of the guide rail frame with respect to the frame body is perpendicular to the axis of rotation of the lamp body with respect to the guide rail frame.

3. The angle-adjustable lamp according to claim 1, wherein:
the frame body comprises a panel and a panel enclosure wall;
the panel has an annular structure, and an inner hole of the panel forms the first opening;
the panel enclosure wall is arranged around the first opening and extends to a side away from the panel to form the mounting space;

an inner wall of the panel enclosure wall protrudes inward in a radial direction to form the annular first guide rail limit portion;

the guide rail frame comprises the annular guide rail limit fitting portion;

an outer diameter of the guide rail limit fitting portion is greater than an inner diameter of the first guide rail limit portion, and the outer diameter of the guide rail limit fitting portion is smaller than or equal to an outer diameter of the first guide rail limit portion;

the frame body comprises a limit member detachably mounted on the panel enclosure wall, at least a part of the limit member being located inside the panel enclosure wall, and the part of the limit member located inside the panel enclosure wall protruding inward along the radial direction of the panel enclosure wall to form the second guide rail limit portion;

a distance between an end of the second guide rail limit portion facing an axis of the panel enclosure wall and the axis of the panel enclosure wall is smaller than an outer radius of the guide rail limit fitting portion and greater than an inner radius of the guide rail limit fitting portion; and a plurality of limit members are provided, and the plurality of limit members are arranged on the panel enclosure wall at uniform spacing.

4. The angle-adjustable lamp according to claim 3, wherein:

the limit member comprises a first limit vertical portion, a second limit vertical portion and a limit connecting portion, the first limit vertical portion being arranged opposite to the second limit vertical portion, and the limit connecting portion being configured to connect same side ends of the first limit vertical portion and the second limit vertical portion;

the first limit vertical portion and the second limit vertical portion are spaced apart such that the first limit vertical portion and the second limit vertical portion are respectively located inside and outside the panel enclosure wall; and an end of the first limit vertical portion away from the limit connecting portion protrudes inward along the radial direction of the panel enclosure wall to form the second guide rail limit portion.

5. The angle-adjustable lamp according to claim 3, wherein:

the panel enclosure wall forms a limit mounting portion in a position where the limit member is mounted;

the limit member is detachably mounted on the limit mounting portion of the panel enclosure wall through a first fastener;

the limit member is provided with a first fastening fit through hole matched with the first fastener, and the limit mounting portion is provided with a second fastening fit through hole matched with the first fastener, a distance between the first fastening fit through hole and the second guide rail limit portion being smaller than a distance between the second fastening fit through hole and the first guide rail limit portion;

the limit mounting portion protrudes respectively on left and right sides of the limit member to form limiting and positioning ribs;

the limit mounting portion of the panel enclosure wall extends along a height direction of the panel enclosure wall to be higher than a part of the panel enclosure wall where the limit mounting portion is not formed;

a side of one of the plurality of limit members facing the lamp body is provided with a first rotation limiting portion; and a side of the guide rail frame away from the lamp body is provided with a second rotation limiting portion which cooperates with the first rotation limiting portion to limit rotation of the guide rail frame.

6. The angle-adjustable lamp according to claim 1, wherein:

two symmetrical sides of a side wall of the lamp body are mounted to the guide rail frame through second fasteners, and the second fasteners on the two sides of the side wall of the lamp body are coaxially arranged to realize a rotatable connection of the lamp body with respect to the guide rail frame;

the side wall of the lamp body is symmetrically provided with two connecting shafts, and a side end surface of each of the connecting shafts away from the lamp body is axially depressed to form a third fastening fit hole matched with the second fastener;

positions on the guide rail frame for mounting and connecting the lamp body are symmetrically provided with two connecting shaft holes that allow the second fasteners to pass through;

the two connecting shafts and the two connecting shaft holes are coaxially arranged; and the second fastener passes through the connecting shaft hole and is in a fastening fit with the third fastening fit hole in the connecting shaft.

7. The angle-adjustable lamp according to claim 6, wherein:

the positions on the guide rail frame for connecting the lamp body form lamp body mounting portions;

the lamp body mounting portions each have a first end surface located below the connecting shaft, a second end surface and a third end surface located on left and right sides of the connecting shaft, and a fourth end surface arranged opposite to a side end surface of the connecting shaft away from the lamp body, and the first end surface, the second end surface, the third end surface and the fourth end surface form a shaft body placement groove for placing the connecting shaft;

sides in the shaft body placement groove opposite to the first end surface and the fourth end surface are opened;

the connecting shaft hole is provided in the fourth end surface;

the guide rail frame comprises a guide rail frame enclosure wall having a cylindrical structure, and the lamp body mounting portion is formed on the guide rail frame enclosure wall; and an outer diameter of the guide rail frame enclosure wall is greater than an outer diameter of the lamp body.

8. The angle-adjustable lamp according to claim 1, wherein:

the lamp body comprises a lamp body housing and a light source assembly;

the lamp body housing has a light source mounting cavity for accommodating and mounting the light source assembly;

a bottom surface of the lamp body housing is provided with a light exit opening;

the light source assembly has a light exit surface, and the light exit surface faces the light exit opening;

the light source assembly comprises a light source body, a reflective cup and a diffusing plate;

a light emitting side of the light source body faces the light exit opening;

the reflective cup has a light entrance port and a light exit port, and an inner wall of the reflective cup connected between the light entrance port and the light exit port forms a reflective surface;

the light entrance port of the reflective cup faces the light emitting side of the light source body, and the light exit port faces the light exit opening;

the diffusing plate is arranged between the light exit port of the reflective cup and the light exit opening to form the light exit surface;

a top surface of the lamp body housing is provided with a mounting opening, and the light source body is matched with the mounting opening;

the angle-adjustable lamp comprises a power supply, and the power supply is connected to the light source assembly so as to provide energy for the light source assembly;

two sides of the frame body are provided with torsion spring clips configured to fix the angle-adjustable lamp;

correspondingly, the frame body is provided with clip seats configured to mount the torsion spring clips; and the torsion spring clip comprises a torsion spring arranged on the frame body and a clip sleeve sleeved over the torsion spring.

* * * * *